United States Patent
Sugimura et al.

[11] 4,067,643
[45] Jan. 10, 1978

[54] INPUT AND OUTPUT DEVICES FOR OPTICAL FIBER

[75] Inventors: Akira Sugimura, Kodaira; Naoya Uchida, Mito; Tatsuya Kimura, Tokorozawa, all of Japan

[73] Assignee: Nippon Telegraph and Telephone Public Corporation, Tokyo, Japan

[21] Appl. No.: 727,493

[22] Filed: Sept. 28, 1976

[30] Foreign Application Priority Data
Sept. 29, 1975 Japan .................... 50-117388

[51] Int. Cl.² ................................. G02B 5/14
[52] U.S. Cl. ......................... 350/96 WG; 250/199; 350/96 C
[58] Field of Search ............ 350/96 WG, 96 C; 250/199

[56] References Cited

U.S. PATENT DOCUMENTS

| | | | |
|---|---|---|---|
| 3,406,358 | 10/1968 | Seidal et al. | 350/96 WG |
| 3,791,715 | 2/1974 | Lean et al. | 350/96 WG |
| 3,871,743 | 3/1975 | Fulenwider | 350/96 WG |
| 3,905,676 | 9/1975 | Ulrich | 350/96 C |

*Primary Examiner*—John K. Corbin
*Assistant Examiner*—Stewart Levy
*Attorney, Agent, or Firm*—Sughrue, Rothwell, Mion, Zinn and Macpeak

[57] ABSTRACT

Input and output devices for an optical fiber include an acoustic transducer for generating a planar acoustic wave tilted at an angle with respect to the axis of an optical fiber embraced by a quartz block. The gap between the optical fiber and the quartz block is filled with a liquid, such as water, to obtain acoustic impedance matching. A desired mode of propagating light can be extracted from the fiber or injected therein by reflection under Bragg's condition through a glass block and optical system without cutting or damaging the optical fiber.

14 Claims, 15 Drawing Figures

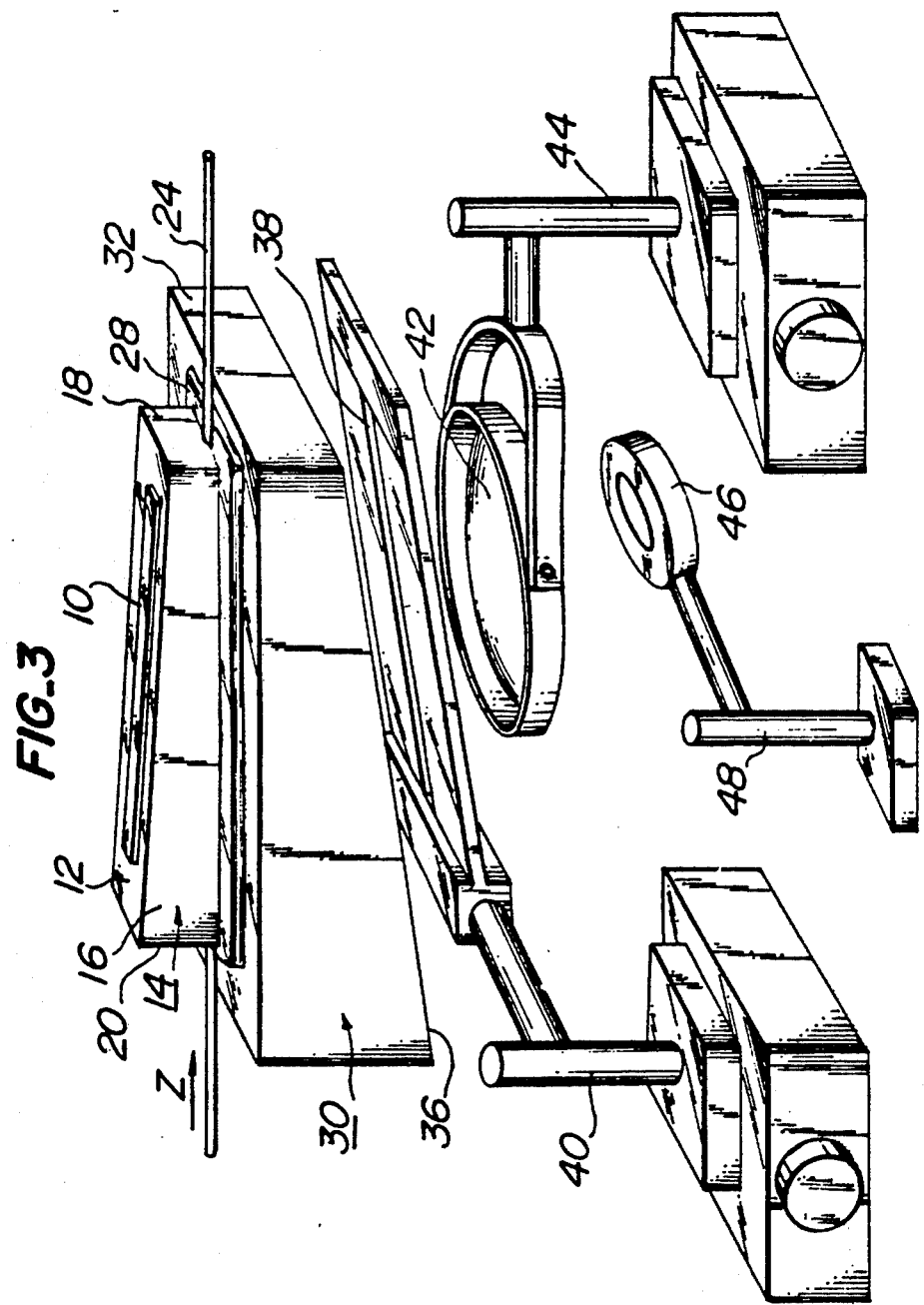

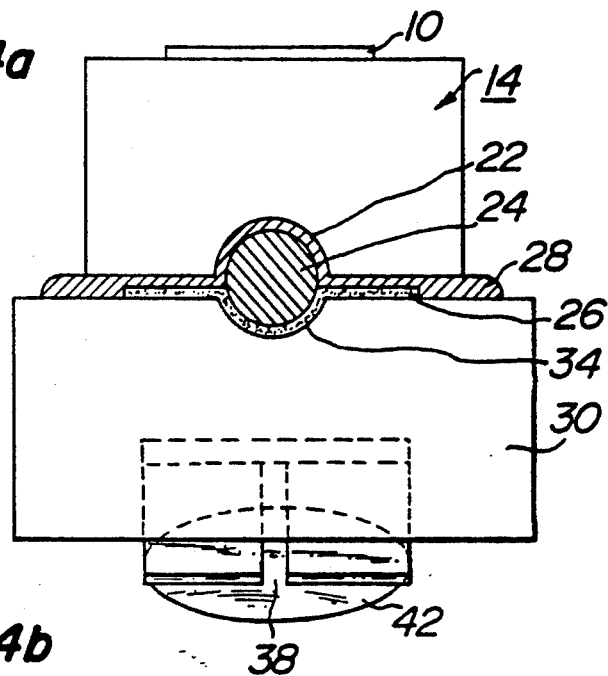
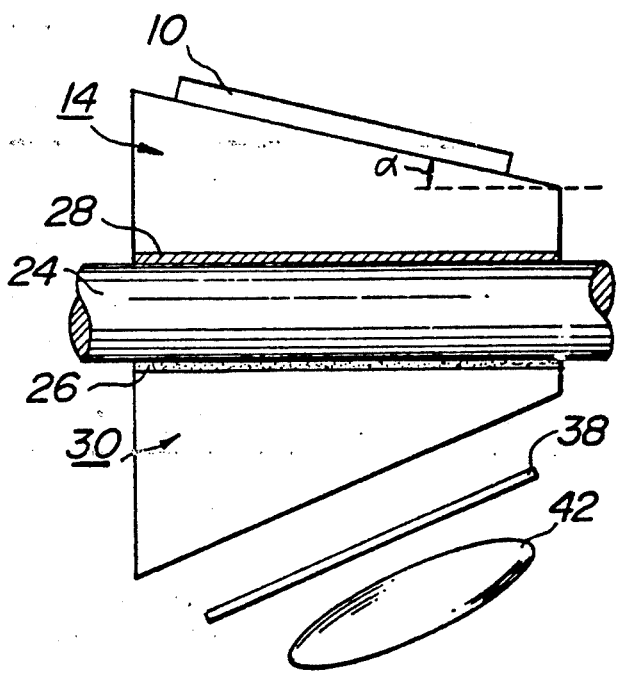

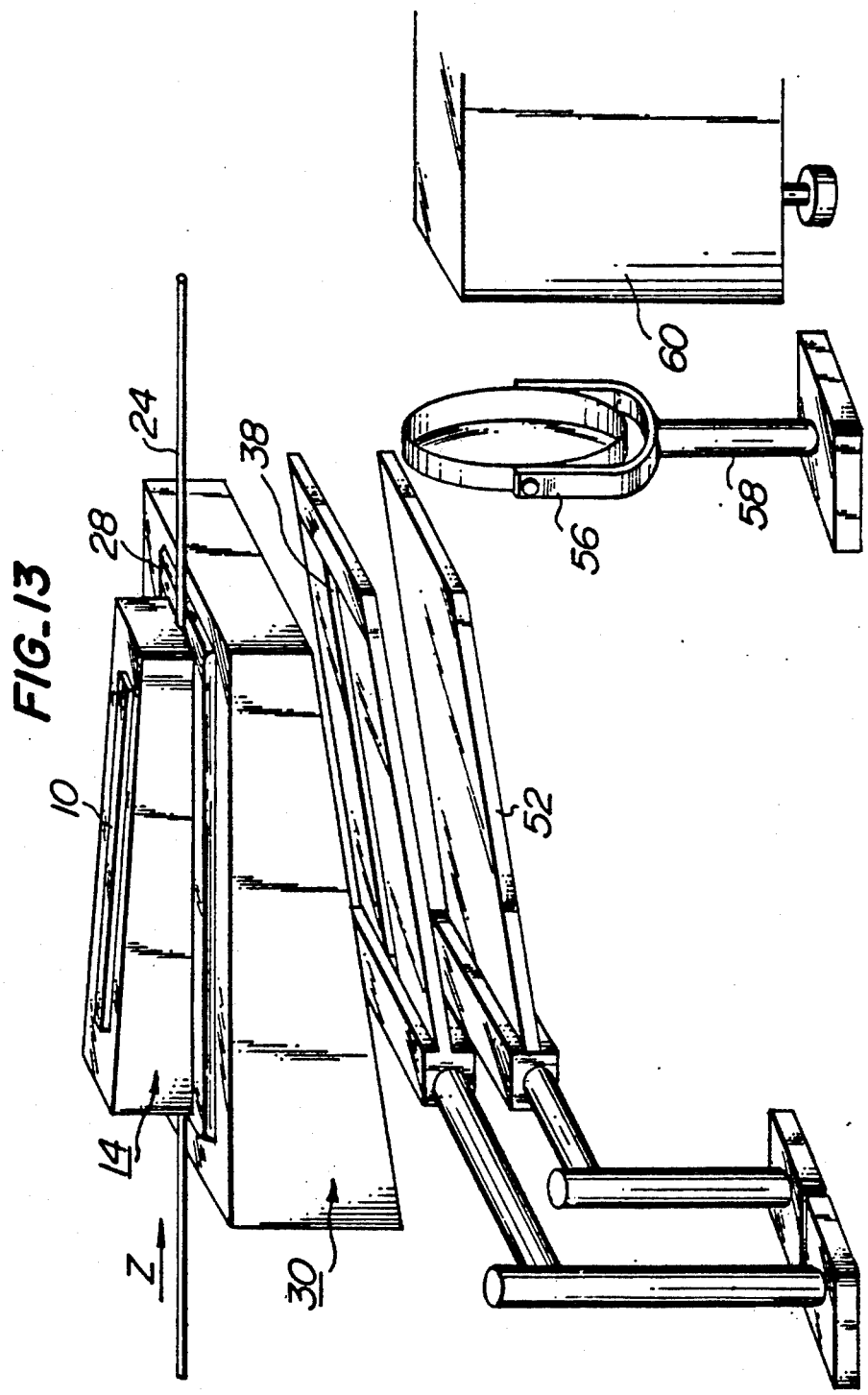

4,067,643

INPUT AND OUTPUT DEVICES FOR OPTICAL FIBER

BACKGROUND OF THE INVENTION

1. Field of the Invention

The present invention relates to acoustic input and output devices for a light conducting optical fiber.

2. Description of the Prior Art

In a conventional input device for an optical fiber, an input light beam is usually introduced into the fiber through its end face either directly or by way of an optical lens system. Such a conventional device suffers from the obvious drawback that the input light beam can only be injected into the optical fiber through an end face, and not at any intermediate location.

There is also a requirement for an optical fiber output device functioning as a mode analyzer or monitor. Two kinds of such output devices are known in the art. The first one extracts a propagating light beam by cutting a portion of the optical fiber where the output is wanted. Such a device is inconvenient since an output light beam cannot be extracted without cutting the optical fiber. In a second such device the optical fiber is machined down to a tapered shape at a desired location to implement the extraction of the propagating light beam. In the device the machining is difficult and troublesome, and the optical fiber cannot thereafter be restored to its original state.

Some correlated prior art in this technical field is listed below:

1. J. E. Fulenwider, U.S. Pat. No. 3,871,743 issued on June 4, 1973,
2. W. V. Smith, "IBM Technical Disclosure Bulletin" 14 No. 2, July 1971, p. 652,
3. E. G. Lean et al, U.S. Pat. No. 3,791,715 issued on Dec. 11, 1972, and
4. R. Ulrich, U.S. Pat. No. 3,905,676 issued on Sept. 16, 1975.

SUMMARY OF THE INVENTION

The present invention mitigates the aforementioned drawbacks of the prior art by providing input and output devices for an optical fiber which can be used to inject or extract a desired guided mode or modes of a propagating light beam at any location on the optical fiber without cutting or machining the fiber. Briefly, and according to the invention, input and output devices for a optical fiber include an acoustic transducer for generating a planar acoustic wave tilted at an angle with respect to the axis of an optical fiber embraced by a quartz block. The gap between the optical fiber and the quartz block is filled with a liquid, such as water, to obtain acoustic impedance matching. A desired mode of propagating light can be extracted from the fiber or injected therein by reflection under Bragg's condition through a glass block and optical system without cutting or damaging the optical fiber.

BRIEF DESCRIPTION OF THE DRAWINGS

In the drawings:

FIG. 3 is a perspective view showing one embodiment of an output device for an optical fiber made according to the present invention, FIG. 4a and FIG. 4b are enlarged partial cross-sectional and longitudinal-sectional views of the output device shown in FIG. 3, FIG. 13 is a perspective view of an embodiment of an input device for an optical fiber according to the present invention.

DESCRIPTION OF THE PREFERRED EMBODIMENTS

In order to enable a clear understanding of the present invention, embodiments thereof will be explained by referring to the attached drawings.

Initially, a basic principle of the interaction between an acoustic wave and a light beam in an optical fiber will be explained. An optical fiber consists of core glass at the center and clad glass at the circumferences. However, for simplification, only a slab or plate type of optical path, in which a plate shaped core of glass is sandwiched between two clade plates, will be considered. In such a slab type optical path, it is sufficient to consider only the influence in two dimensional propagation. The interaction is analyzed by means of a coupled mode equation and the phase matching condition is obtained from the solutions thereof. From the solutions it has been found that two such phase matching conditions exist as shown by the vector diagrams of FIGS. 1a and 1b. In such phase matching conditions, the light propagating in a guided mode is strongly reflected at the core surface and changes to a radiation mode.

If we assume $\lambda$, $n_1$, and $n_2$ to be the wavelength of the transmitting light in vacuo, the refractive index of an optical fiber core and the refractive index of its clad plates, respectively, then the wave number $k_1$ of a plane shaped light wave in the core and the wave number $k_2$ of a plane shaped light wave in the clad may be expressed as follows.

$$k_1 = 2\pi/\lambda n_1 \quad (1)$$

$$k_2 = (2\pi/\lambda)n_2 \quad (2)$$

Figure 1A:
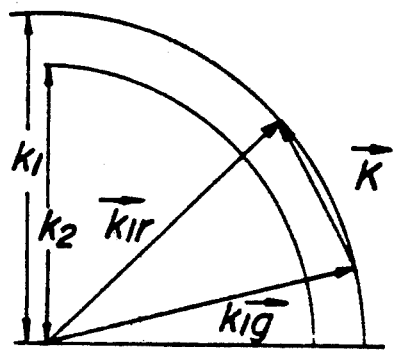
FIG. 1a and FIG. 1b are diagrams for explaining two phase matching conditions among the wave vectors of the guided mode, radiation mode and the acoustic wave transmission.

FIG. 1a corresponds to a term obtained from the calculation of the interaction in the core. This term satisfies the so-called Bragg's condition as follows:

$$\vec{k_{1g}} + \vec{K} = \vec{k_{1r}} \quad (3)$$

wherein $\vec{k_{1g}}$ is a wave vector of the light in the core in the guided mode, $\vec{k_{1r}}$ is a wave vector of the light in the radiation mode, and $\vec{K}$ is a wave vector of the acoustic wave.

Figure 1B:
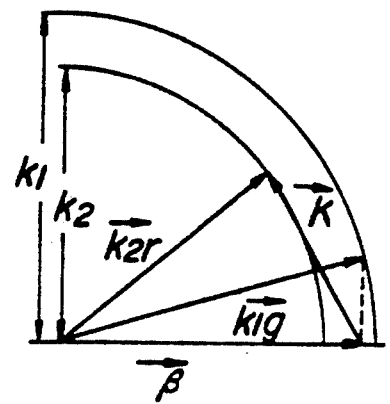

Similarly, FIG. 1b corresponds to a term derived from the calculation of the interaction in the clad portion. This phase matching condition is given by the following equation:

$$\vec{\beta} + \vec{K} = \vec{k_{2r}} \quad (4)$$

wherein $\vec{k}_{2r}$ is a wave vector of the light in the radiation mode in the clad portion and $\vec{\beta}$ is an orthogonal projection to the fiber axis of the wave vector $\vec{k}_{1g}$ in a guided mode in the core. If we term the wave vector of the light in a guided mode in the clad to be $\vec{\beta}$, then equation (4) may be regarded as the Bragg's condition or rule in the clad portion.

Figure 2:
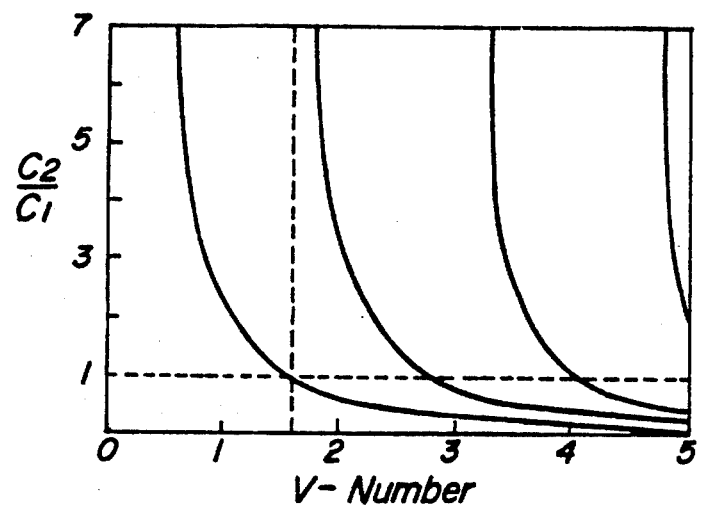
FIG. 2 is a diagram for explaining a relation between the normalized frequency V and the coupling constant ratio $C_2/C_1$.

FIG. 2 is a diagram for showing which of two phase matching conditions as shown in FIGS. 1a and 1b prevails in practice. FIG. 2 shows a relation between a ratio of two coupling constants $C_2/C_1$ and the normalized frequency V, wherein $C_1$ is a coupling constant between the guided mode and the radiation mode when the phase matching condition shown in FIG. 1a is satisfied, and $C_2$ is that when the condition shown in FIG. 1b is satisfied.

The value of the normalized frequency V, hereinafter referred to as the V number, in an optical fiber path is given by the following equation:

$$V = (2\pi a/\lambda)\sqrt{n_1^2 - n_2^2}, \qquad (5)$$

wherein $a$ is radius of the fiber core and $\lambda$ is the wavelength of the light propagating in vacuo. This V number of the normalized frequency is a parameter for defining the construction of the optical fiber. In this respect reference is made to the text by Kapany and Burke entitled "Optical Waveguides"; Academic Press.

In a region in which the V number is less than 1.57, only a single mode of propagation exists. This region is referred to as a single mode region. When the V number increases above 1.57, a greater number of modes appear in proportion to the increase of the V number.

In FIG. 2, a horizontal dotted line passing through the point where $C_2/C_1 = 1$ represents a portion wherein the phase matching conditions shown in FIGS. 1a and 1b contribute up to the same extent. Above the dotted line, wherein $C_2/C_1 > 1$, is a region in which the conditions shown in FIG. 1b prevail. Below the dotted line, wherein $C_2/C_1 < 1$, is a region in which the conditions shown in FIG. 1a prevail.

From FIG. 2, in the single mode region, wherein V is less than 1.57, the phase matching condition as shown in FIG. 1b is to be considered since in that region $C_2/C_1$ is larger than 1 ($C_2/C_1 > 1$). In the multi-mode region, wherein V is larger than 1.57, i.e., on the right side of V = 1.57, higher modes appear successively according to an increase in the V number. However, most of the higher modes pass the region where $C_2/C_1 < 1$. Therefore, as a close approximation only the phase matching condition shown in FIG. 1a may be considered.

The invention will be explained at first by describing an example of an output device for a multi-mode optical fiber made in accordance with the present invention which may be used as a mode analyzer. According to the previous explanation it is sufficient that only the condition shown in FIG. 1b be taken into account in an output device for a multi-mode optical fiber.

FIG. 3 is a perspective view of an output device for an optical fiber, and FIGS. 4a and 4b are partially enlarged cross-sectional views thereof.

Referring to FIG. 3, an acoustic transducer 10 is mounted on an inclined surface 12 of a quartz block 14 having trapezoidal side surfaces 16 and rectangular end surfaces 18 and 20, as best seen in FIGS. 4a and 4b. The quartz block 14 is provided with a groove 22 having nearly the same radius as an optical fiber 24 through which the light, whose mode distribution will now be analyzed, is transmitted in a direction from left to right as shown by the arrow Z. The optical fiber 24 has a core made of a fused quartz having the refractive index, for instance, of 1.46. In actual practice the optical fiber is very thin. For instance, the core diameter is on the order of 100 μm. In FIGS. 4a and 4b the optical fiber is shown greatly enlarged for the purpose of explanation, and it should be noted that these figures are not drawn on an exactly proportional scale. A glass block 30, also having trapezoidal side surfaces and a narrower end face in the same side with that of the quartz block 14, is arranged so as to embrace the optical fiber 24 in its groove 34 together with the quartz block 14. This glass block 30 is made of an optical glass having a higher refractive index than that of the glass fiber 24. As mentioned above, if the refractive index of the glass fiber is chosen to be 1.46, the refractive index of the glass used for the glass block 30 may be 1.51 for a light beam having a wavelength of 6328 Å.

An example of such an optical glass is known under the tradename of BK7.

An optically transparent sheet 26 having a higher refractive index than that of the optical fiber 24, for example, a polyethylene sheet having a refractive index of 1.476, is arranged in the groove 34 of the glass block 30 and around the lower half surface of the optical fiber 24.

Matching liquid 28 for the acoustic wave is introduced between the optical fiber 24 and the quartz block 14 by capillary action. This matching liquid may be water, which has a less absorbing effect for the acoustic wave and has less reflection loss at the boundary surfaces between the quartz block 14 and the optical fiber 24 by reason of the small difference of the acoustic impedance.

A slit 38 is provided substantially parallel with the inclined bottom surface 36 of the glass block 30 and aligned with output optical beam. The slit 36 is defined by a plate member supported by a suitable support means 40. A converging lens 42 is provided below the slit 38 and is supported on a suitable support means 44. A photo detector 46 is supported by a support means 48 around the focal point of the lens 42.

By arranging the radius of the groove 22 in the quartz block 14 to be nearly equal to the radius of the optical fiber 24, or by arranging the clearance to be very small, the lens effect for the acoustic wave in the water 28 therebetween can be made very small even though the velocity of sound in the water is different from that in the quartz block 14 and in the optical fiber 24. Thus, the plane wave component of the acoustic wave derived from the acoustic transducer 10 can be introduced into the optical fiber 24 without any substantial change of such plane wave component.

the abovementioned acoustic matching is a very simple technique, and it is possible to obtain outputs in each different direction according to the respective guided modes. This will be explained hereinafter. The groove 22 in the quartz block 14 having a radius on the order of 100 μm can be manufactured by drawing a thick quartz tube to make the inner hole very small and by cutting the thus drawn thin tube.

In operation, the acoustic transducer 10, which may consist of a bulk body of $LiNbO_3$ or a thin film of ZnO, is excited with a high frequency electric voltage to generate an acoustic wave in the ultrasonic range. As can be seen from FIG. 4b, the acoustic transducer 10 is secured on the top surface of the quartz block 14 which is inclined at an angle $\alpha$ to the axis of the optical fiber 24. The acoustic wave, generated by the transducer 10 and incident upon the optical fiber 24, is also inclined at an angle $\alpha$ to the axis thereof. This angle $\alpha$ can be set at a desired value, which will be explained hereinafter, by suitably selecting the tilt or inclination angle $\alpha$ of the quartz block 14. Each of the guided modes of the light beam passing through the optical fiber 24 are reflected in the fiber by the acoustic wave according to Bragg's condition, and a part or whole thereof is emanated down through the glass block 30. The portion of the light passing through the slit 38 is collected by the lens 42 and detected by the photo detector 46.

By changing the frequency of the acoustic wave generated by the transducer 10, each of the guided modes of the light beam passing through the optical fiber 24 can be reflected out in succession. The output light beams may be detected by the photo detector 46, which may be an avalanche photo-diode, and the modes may thereafter be suitably analyzed.

In an alternate embodiment, the frequency of the acoustic wave is fixed in the device shown in FIG. 3, but by spatially moving the slit 38 and the lens 42, the various modes propagated in the optical fiber 24 may be read out in succession. In this case, the modes may also be sensed by the photo detector 46. The mode detection may also be effected by placing a photographic film at the slit 38 and taking a far field pattern photograph of the scattered output light.

The guided modes in the core of the clad type optical fiber core having a propagation constant $\beta$ can be expressed by the following equations:

$$J_m(\frac{ur}{a})\cos m\phi e^{i(\omega t - \beta z)} \tag{6}$$

or $$J_m(\frac{ur}{a})\sin m\phi e^{i(\omega t - \beta z)}, \tag{7}$$

wherein;
  $J_m$ is $m$th order Bessel function,
  $r$ and $\phi$ are positional coordinates expressed in the cylindrical coordinate system,
  $z$ is a function expressing the direction of the optical fiber,
  $m$ is the number of modes at a given angle direction,
  $a$ is the radius of the core,
  $\omega$ is the angular frequency of the light, and
  $t$ is time.

For a more detailed development, refer to the text by D. Marcuse entitled "Theory of Dielectric Optical Waveguide"; 1974, Academic Press.

Further, if we assume the wave number of the plane wave of the light beam in a core is $k_1$, the normalized propagation constant $u$ in the radial direction is given by the following formula:

$$u^2 = a(k_1^2 - \beta^2).$$

By expanding the above equation of the guided mode, whose propagation constant is $\beta$, by using a plane wave, the following equations are derived for multi-mode transmission in an optical fiber:

$$\int \cos m\theta e^{i(\omega t - \frac{ur}{a}\cos(\phi - \theta) - \beta z)}d\theta \tag{8}$$

or $$\int \sin m\theta e^{i(\omega t - \frac{ur}{a}\cos(\phi - \theta) - \beta z)}d\theta. \tag{9}$$

For more detail refer to the text by P. M. Morse and H. Feshback entitled "Method of Theoretical Physics"; 1953, McGraw Hill.

Figure 5:
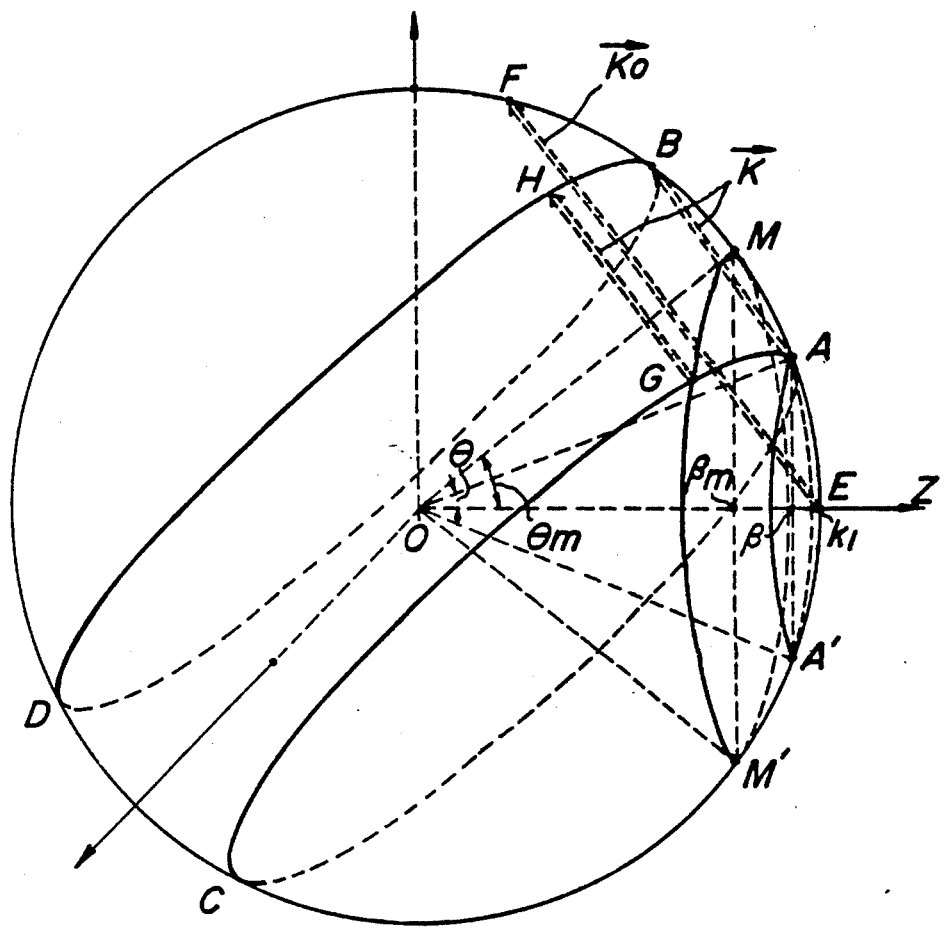
FIG. 5 is a diagram showing the relation among the wave vectors of the guided mode, the acoustic wave and the scattered light in a multi-mode optical fiber.

The principle of the invention will now be further explained by referring to FIG. 5. FIG. 5 shows the relation among the wave vectors of the guided modes, including the acoustic wave and the scattered waves. In FIG. 5, the direction of $z$ represents the axial direction of the optical fiber. According to equations (8) and (9), the guided modes, having the propagation constant $\beta$, can be expressed by the components of wave vectors originating from an origin O and arriving at points on a circular line AA' having its center on the axis $z$ and a radius of $k_1 \cdot \sin\theta$. Here the propagation angle $\theta$ is defined by the following equation:

$$\sin\theta = (u/ak_1).$$

This means that the components of the wave vectors are limited to lie on generating lines of a right circular cone OAA'.

A plane acoustic wave incident upon the optical fiber has a certain tilt angle $\alpha$ with the axis of the fiber. Consider now a condition where an acoustic wave having a wave vector $\vec{K}$ is introduced into the optical fiber under a geometrical relation shown in FIG. 5, in which a wave vector $\vec{OA}$ plus $\vec{K}$ equals $\vec{OB}$. According to equation (3) this condition means that Bragg's condition is satisfied, or in other words, the reflected beam toward the direction of the vector $\vec{OB}$ is stronger than the diffused light beam in any other direction.

Since there exists a condition that:

$$|\vec{K}| = (2\pi f/W),$$

wherein $f$ is the frequency of the acoustic wave and $W$ is the velocity of the acoustic wave, the light beam can be taken out by making the acoustic frequency $f$ or the absolute value of the wave vector $\vec{K}$ so large that the vector $\vec{OB}$ will not become a guided mode. The desired condition for the frequency $f$ may be given by the following equation:

$$f \geq \frac{W 2k_1}{2\pi} \sin\frac{\theta m - \theta}{2}. \tag{10}$$

In this case, the tilt angle $\alpha$ is given by the following:
$$\alpha = \theta \sin^{-1}(\pi f/k_1 W). \tag{11}$$

By observing the light thus taken out, the light intensity for the mode having a propagation constant $\beta$ can be presumed. In this method, the mode of light for satisfying Bragg's condition with the wave vector $\vec{K}$ is not only the vector $\vec{OA}$, but all vectors connecting the origin O with any point on the circle AC. For instance, vector $\vec{OG}$ satisfies Bragg's condition, and reflected or scattered vectors connect the origin O and the circle BD. Here, both the circles AC and BD are on parallel planes passing through the points A and B, are normal to the wave vector $\vec{K}$, and a sphere having an origin O and a radius $k_1$. The modes having a propagation coefficient of $\beta$ or less than $\beta$ are all taken out or extracted from the optical core. Furthermore, as can be clearly seen from FIG. 5, the direction of the light reflected from the optical fiber by Bragg's condition differs depending on the value of $\beta$.

If all the modes are to be taken out, it is necessary to make the lowest mode reflected to a radiation mode. Referring to FIG. 5, this means that the wave vectors must satisfy the following equation:

$$\vec{OE} + \vec{K} = \vec{OM}.$$

Accordingly, from this equation, the necessary acoustic frequency $f$ is given as follows:

$$f = (Wn_1/\lambda)\sqrt{2\delta}, \quad (12)$$

wherein W is the sonic velocity of the acoustic wave and $\delta$ is a relative refractive index difference and is given as follows:

$$\delta = (n_1 - n_2/n_1). \quad (13)$$

Figure 6:
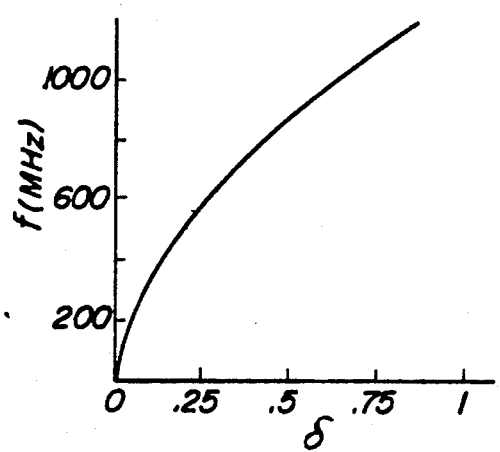
FIGS. 6 to 11 are diagrams for explaining various characteristics of an optical fiber.

If we introduce in equation (12) the value of the sonic velocity in the fused quartz for W and the value of the refractive index of fused quartz for $n_1$, the frequency $f$ varies as shown in FIG. 6 against the value of $\delta$. In practice, the value of $\delta$ is between 0.05% to 1.0%, so that the frequency range of 270 MHz to 1,200 MHz may be used. The tilt angle $\alpha$ of the acoustic transducer is given by the following equation for satisfying Bragg's condition:

$$\alpha = 2\sin^{-1}(2\pi f/2k_1 W). \quad (14)$$

Figure 7:
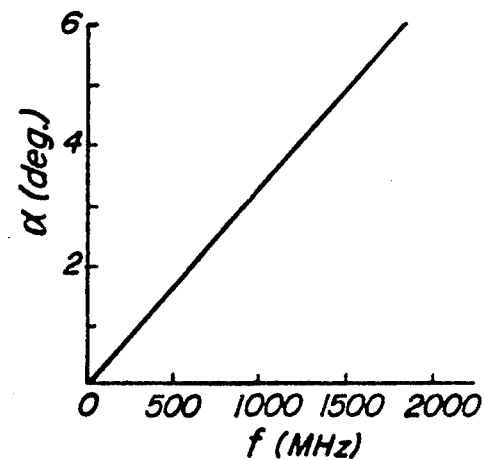

FIG. 7 shows the relation between the tilt angle $\alpha$ and the acoustic frequency $f$ for a multi-mode optical fiber.

Figure 8:
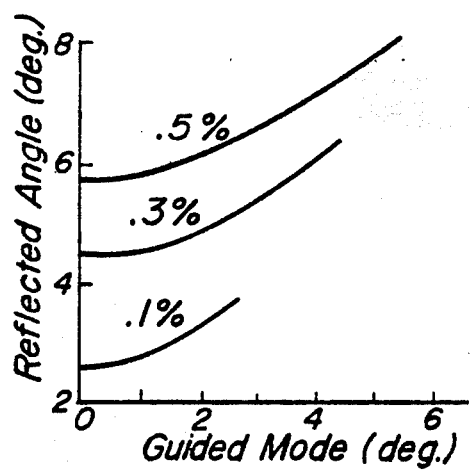

FIG. 8 shows the reflected angle for each mode in the core when acoustic waves of 390 MHz, 675 MHz and 870 MHz are successively radiated onto glass fibers whose relative refractive index differences $\delta$ are 0.1%, 0.3% and 0.5%, respectively, The light is refracted when it leaves the core and enters the clad, so that the emanating angle of the light from the clad becomes smaller.

As has been explained with reference to FIGS. 3 and 4a, a transparent sheet 26 is inserted between the optical fiber 24 and the glass block 30. The transparent sheet has a higher refractive index than that of the optical fiber 24 and is made of, for example, polyethylene. By the provision of the transparent and higher refractive index sheet and by making the refractive index of the glass block 30 higher than that of the optical fiber 24, the scattered light can be taken out. If the refractive indices of the transparent sheet and the glass block are lower than that of the glass fiber, the light arriving at the boundary of the clad is totally reflected back into the optical fiber and cannot be taken out, though the guided mode is converted to the radiation mode by Bragg's condition.

The incident angle resolution $\Delta\gamma$ under Bragg's condition is determined by the following formula:

$$\frac{|\vec{K}|L}{2}\{\sin(\gamma_B + \Delta\gamma) - \sin\gamma_B\} \approx \frac{\pi}{2}, \quad (15)$$

(For the more detail, refer to the text by Uchida and Niizeki entitled "Acoustic Deflection Materials and Techniques"; Proc IEEE Vol. 61, p. 1073, 1973) wherein L is the length of the acoustic transducer, and $\gamma_B$ is Bragg's angle as given by the following:

$$\sin\gamma_B = \frac{|\vec{K}|}{2k_1}.$$

Figure 9:
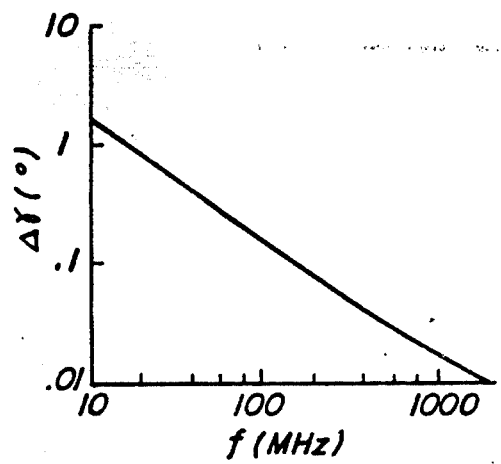

The relation between the resolution angle $\Delta\gamma$ and the acoustic frequency $f$ (MHz) is shown in FIG. 9. Compared to the allowable guide angle of an optical fiber which is on the order of a few degrees, the resolution for frequencies over 10 MHz, which itself is less than 2° according to FIG. 9, is increasingly smaller. Accordingly, for frequencies over 10 MHz the device is well suited as an output device for a mode analyzer.

When Bragg's condition is satisfied, the intensity of Bragg reflection is in proportion to $\sin^2(k_1\Delta n L/2)$, (Refer to Uchida and Niizeki as above) wherein $\Delta n$ is the variation of the refractive index due to an acousto-optical effect and is given by the following:

$$\Delta n = \sqrt{M_2 P_A/2}. \quad (16)$$

Here, $P_A$ is the power density of the acoustic wave and $M_2$ is a figure of merit of the acousto-optical effect determined by the material used.

When fused quartz is used as the optical fiber, and if we assume that the interaction between the light beam and the acoustic wave is effected in an area of 10 mm × 0.1 mm, then about 6.8 W of acoustic wave power is required for obtaining 100% reflection.

Figure 10:
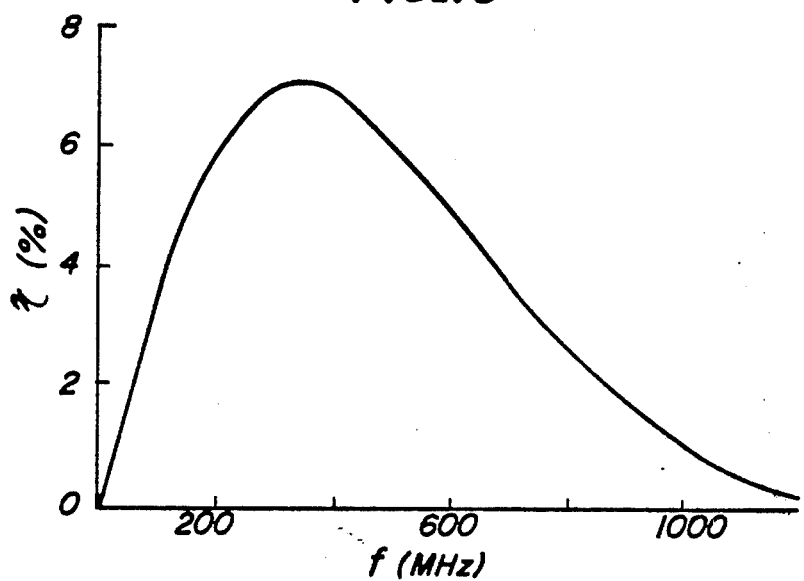

In actual practice, however, using a 10 mm = 0.1 mm acoustic transducer, a quartz block of 1 mm width, an optical fiber having a 100 μm radius, water between the optical fiber and the quartz block having clearance of 50 μm, and an input power of 6.8 W to the acoustic transducer in the device as substantially shown in FIG. 3, the ultrasonic acoustic wave may be damped by reflection, absorption or refraction during its transmission and hence a greater input power may be needed. The above losses have a frequency dependent nature and the output efficiency $\eta$ in (%) plotted against the acoustic wave frequency $f$ (MHz) is shown in FIG. 10. In the above it has been assumed that the conversion efficiency of the transducer is 100%.

Considering now a situation in which the lowest order mode, or the mode having a propagation angle $\theta = 0$, just satisfies Bragg's condition with a wave vector $\vec{K}_0$ in FIG. 5, the situation may be expressed as follows:

$$\vec{OE} + \vec{K}_0 = \vec{OF}.$$

In this case, Bragg's condition for the mode having a propagation angle $\theta$ becomes:

$$\vec{OA} + \vec{K} = \vec{OB}.$$

Since the transducer is fixed, $\vec{K}$ is parallel to $\vec{K}_0$. Accordingly, by varying only the absolute value of $\vec{K}$, i.e., varying $|\vec{K}|$, to obtain the output of all the modes it is necessary to make the propagation angle $\theta$ of the reflected light $\vec{OF}$ of the lowest guided mode $\vec{OE}$ larger than $2\theta_m$, wherein $\theta_m$ is the propagation angle of the highest guided mode. By obtaining the above condition, both $\vec{OF}$ and $\vec{OB}$ become radiation modes and the light beam of each mode may be read out in succession by varying the absolute value of $\vec{K}$.

In other words, by fixing the angle $\alpha$ at any convenient value over $\theta_m$, the following can be obtained from equation (11):

$$f = k_1 W/\pi) \sin(\alpha - \theta). \qquad (17)$$

This means that by varying the frequency $f$ of the acoustic wave, different guided modes having different propagation angles $\theta$ in the guided mode can be read out. In this case, the frequency $f$ from equation (17) may be changed from $k_1 W/\pi \sin\alpha$ to $k_1 W/\pi \sin(\alpha - \theta_m)$ and the propagation angle $\theta$ can be changed from 0 to $\theta_m$.

When we consider an optical fiber having a difference between the refractive indices of the core and clad $\delta$ of 1% (or as a second example 0.1%), the angle $\theta_m$ is about 8.1° (2.6°), and the maximum frequency $f_m$ of the acoustic frequency $f$ should be greater than:

$$f_m = \frac{k_1 W}{\pi} \sin\alpha \geq \frac{k_1 W}{\pi} \sin\theta_m.$$

This means that the maximum frequency $f_m$ should be more than 2.5 GHz (780 MHz). The transducer may be mounted at a tilt angle $\alpha$ of 8.1° (2.6°) relative to the axis of the optical fiber, as seen from FIG. 7, when the acoustic frequency $f$ is 2.5 GHz (780 MHz). The frequency $f$ may be varied over a range of 2.5 GHz (780 MHz). By varying the frequency $f$ of the acoustic wave in such a manner, it is possible to read out all of the guided modes of the light beam passing through the optical fiber by varying only the absolute value $|\vec{K}|$ of the wave vector $\vec{K}$. Furthermore, if the device is used in an input mode, which will be explained later, it has the advantage of being able to introduce all of the guided modes.

In a further embodiment of the present invention, the frequency of the acoustic wave produced by the acoustic transducer is so selected that the propagation angle of the reflected light of the lowest order guided mode light transmitted in the optical fiber, by Bragg's condition, becomes larger than the propagation angle $\theta_m$ of the highest order light being transmitted, and thus various guided modes can be read out. This means that the frequency $f$ of the acoustic wave and the tilt angle $\alpha$ are selected for a value of $\theta = 0$ in equations (10) and (11).

As an example, the frequency $f$ of the acoustic wave may be fixed at a suitable value higher than 1.23 GHz (or as a second example 390 MHz) for an optical fiber whose relative refractive index difference $\delta$ is 1% (0.1%), as can be seen from FIG. 6. The tilt angle $\alpha$ of the acoustic transducer is adjusted to satisfy Bragg's condition for the lowest guided mode at the above frequency, and thus all of the various modes can be read out. In one example, a 1.5 GHz transducer is fixed at a tilt angle of 4.9° and in another example a 400 MHz transducer is fixed at an angle of 1.3°. For a plot of the tilt angle $\alpha$ as a function of transducer frequency, refer to FIG. 7.

The reflected light of each mode is emanated in a different direction, so that each mode may be read out in succession by moving the lens together with the slit.

If the device is used as a mode analyzer, the slit and the lens may be removed and a photograph of the far field pattern may be taken at the slit position. The advantage of obtaining the outputs of all of the guided modes is the same as with the previous example in which the absolute value $|\vec{K}|$ of the wave vector $\vec{K}$ is adjusted.

As has been explained above, the device according to the present invention may be used as a mere optical monitor. In this case, only a part of the transmitted light beam may be read out at an arbitrary location of the optical fiber without altering or affecting the guided modes of the light beam.

As further mentioned above, it is advantageous to read in or extract the light beam using the phase matching condition shown in FIG. 1b in the case of a single mode optical fiber. The phase matching condition when expressed by equation is as follows:

$$f = \frac{1}{\frac{W}{2\pi}\sqrt{\beta^2 + k_2^2 - 2\beta k_2 \cos\{180° - \alpha - \sin^{-1}(\frac{\beta}{k_2}\cos\alpha)\}}} \qquad (18)$$

In this equation, the symbols have the same meaning as mentioned before. If the tilted angle $\alpha$ of the transducer is set in a suitable range to satisfy the condition of $(\beta\cos\alpha/k_2) \leq 1$, then the frequency $f$ is determined as a function of $\beta$. Thus, by adjusting the frequency $f$ of the acoustic wave to satisfy equation (18) for a desired guided mode, such mode of light may be read out.

When the $\beta$ value of a single mode fiber is unknown, it can be determined by observing the change of the output light intensity as the frequency $f$ is varied. When the output light intensity becomes maximum at a certain value of frequency $f$, then the $\beta$ value may be calculated from equation (18).

Figure 11:
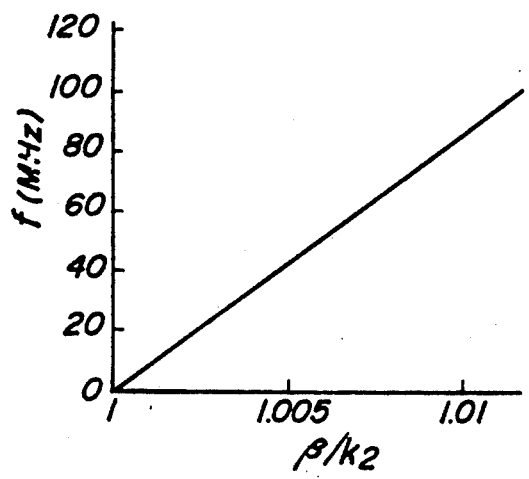

An embodiment having a tilt angle $\alpha$ of 45° will now be considered. The relation between $\beta$ and $f$ is shown grafically in FIG. 11. In the abscissa the value of $\beta$ normalized by $k_2$, i.e., $\beta/k_2$ is plotted. The guided mode is in the region of $\beta/k_2 > 1$. The value of the relative refractive index difference $\delta$ of an optical fiber in practice lies in the region around or less than 1%, so that $\beta/k_2$ may be less than about 1.01.

By calculation, the frequency $f$ of the acoustic wave for reading out the light is less than about 100 MHz, and is therefore in a comparatively low frequency range. Furthermore, since $\beta$ and $f$ are monotonous functions, by varying the value of $f$ between 0 and 100 MHz and noting the value of $f$ at which the maximum intensity light is read out, it is possible to determine the propagation constant $\beta$ of the guided mode and thus the device may be used as a mode analyzer for a single mode.

Figure 12:
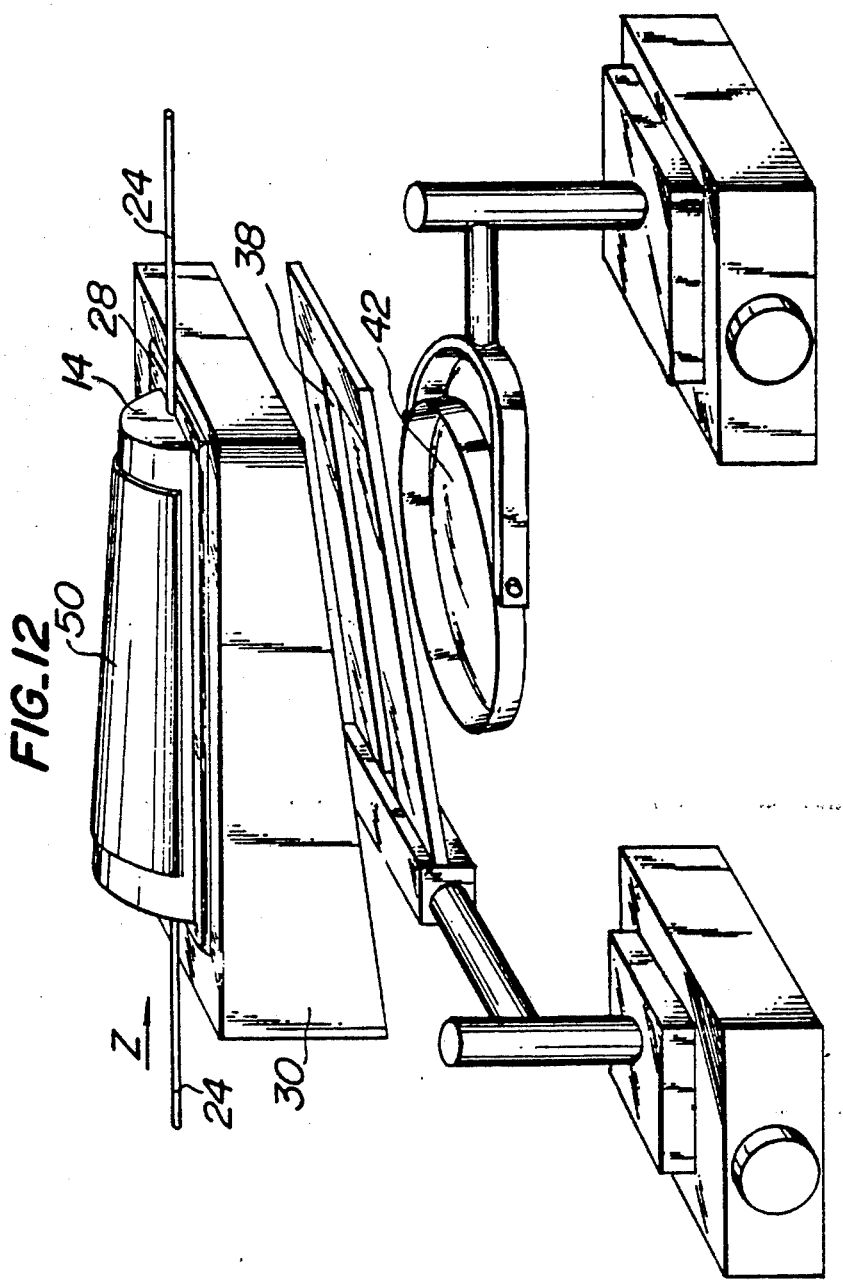
FIG. 12 is a perspective view of an output device for an optical fiber using a converging type of acoustic transducer according to the present invention.

In the foregoing explanation, the acoustic transducer is plate shaped and a planar acoustic wave is generated. However, by using an acoustic transducer 50 having a curved surface as shown in the embodiment of FIG. 12, it is possible to further concentrate the acoustic power in the optical fiber, whereby greater efficiency can be obtained.

If the device is to be used in an input mode, the ultrasonic acoustic wave is generated in the same manner as explained above and the input light beam is fed into the device from reverse direction of the emanation of the output light. The light beam is reflected by the acoustic wave, according to Bragg's condition, and it becomes a part or the whole of the guided mode in the optical fiber. The direction of propagation in the optical fiber is opposite to that of the output device. An electromagnetic wave is reversible with respect to time, so that if it is possible to make the wave front of an incident light beam coincident with that of an output light beam but travelling in the reverse direction, the relation between the incident light and the guided mode will be the same as the relation between the output light and the guided mode, as developed above.

As an exemplary embodiment of an optical system for generating an incident light beam having a reversely propagating wave front with respect to that of an output light beam, an input optical device using a hologram coupler will now be described with reference to FIG. 13, which shows a simplified perspective view of such an input device. At first the manner of producing an input hologram will be explained. By applying a light beam to the optical fiber 24 in a direction Z as shown by the arrow, and by generating an acoustic wave in the transducer 10, the device operates as an output device and an output beam exits through the glass block 30. In this condition, a photographic plate 52 for the production of a hologram is placed as shown and a laser beam is produced by a laser generator 60 through a lens 56 while the slit 38 is removed. As is well known in the art, the laser beam and the output light beam create an interference pattern on the photographic plate 52. The exposed plate is then developed to obtain a hologram, which, in the input mode, is positioned at the same location (52). The laser beam is again emanated from the generator 60 through the lens 56 mounted on support means 58, and the slit 38 is positioned as shown in FIG. 13. With this arrangement an input light beam is generated which propagates exactly in reverse to the output light beam, and the input light beam can be fed into the optical fiber by appropriately energizing the transducer 10 as developed above. The relation between the incident input light beam and the guided mode is the same as between the output light beam and the guided mode. By varying the width or location of the slit 38 and/or the frequency of the acoustic wave, the incident light beam can be fed into the optical fiber either in a particular mode or in all the modes therein.

The input resolution will be the same as that of the output mode. The input efficiency will be lowered slightly as compared with the output efficiency due to low diffraction efficiency of the hologram.

As has been explained in the foregoing, the input and output devices for an optical fiber according to the present invention inject in or extract out the light beam by using Bragg reflection, and have the significant advantage that the light can be read in or out without cutting or damaging the optical fiber. Furthermore, no rigid or permanent connections are necessary between the quartz block and the optical fiber, whereby the device is portable and can be arranged freely at any desired location for use in the input or output modes.

When the device is used in an output mode, it is possible to extract each of the propagated light modes separately so that complete mode analysis is possible at any desired location on the optical fiber. The device can also be used as an optical monitor, whereby the transmission characteristics of the optical fiber may be measured during the manufacture thereof. Such measurements may be used in a feedback loop for controlling the manufacturing of the fiber.

When using the device in an input mode the light can be injected at any desired location of the optical fiber, whereby the device may be used for the detection of faults or trouble points, or as a transmission tester for the connection or adjustment of the optical fiber. By a combined use of the input and output modes, a more effective transmission tester can be realized.

Separate input and output devices may be mounted at an arbitrary span on an optical fiber, whereby it is possible to send a signal from the input device to the output device to form a communication link without cutting the fiber.

While the principles of this invention are not limited to the propagation of any particular type or mode of communications signal, significant promise and potential would appear to lie in the field of wideband digital communications for telephone subscriber systems.

What is claimed is:

1. An acoustical output device for an optical, light conducting fiber, comprising: a quartz block having a semi-circular groove therein of a radius substantially equal to that of an elongated, circular optical fiber, said block having an inclined upper surface, an acoustic transducer secured to said upper surface, a glass block having a refractive index higher than that of the optical fiber and having a semi-circular groove therein of a radius substantially equal to that of the optical fiber, said glass block having an inclined bottom surface, the quartz block and the glass block being arranged to embrace the optical fiber within their respective grooves at a location where an output is desired, the inclined surfaces of the blocks being opposite each other with the narrower ends thereof together, an optically transparent sheet arranged between the groove of the glass block and the optical fiber, a liquid, such as water, provided between the optical fiber and the quartz block, such liquid having a low absorption loss for an acoustic wave and an acoustic impedance close to that of the quartz block to thereby cause a small reflection loss for an acoustic wave, the acoustic transducer being arranged to generate an acoustic wave having an inclined wave front with respect to the axis of the optical fiber along which light is propagated in guided modes to thereby cause light to be reflected by Bragg's condition to a radiation mode, and an optical output system aligned with a beam of output light emanated from the optical fiber, the optical output system being separably arranged from the glass block.

2. An output device for an optical fiber as claimed in claim 1, wherein the optical fiber is a single mode fiber, and for obtaining an output mode whose propagation constant is $\beta$, the inclination angle $\alpha$ of the acoustic transducer with respect to the axis of the optical fiber is selected to satisfy the condition:

$$\beta/k_2 \cos\alpha \leq 1,$$

wherein $k_2$ is the wave number of a planar wave in a clad of the optical fiber, and the frequency $f$ of the acoustic transducer is given by:

$$f = \frac{W}{2\pi} \sqrt{\beta^2 + k_2^2 - 2\beta k_2 \cos\{180° - \alpha - \sin^{-1}(\frac{\beta}{k_2}\cos\alpha)\}} ,$$

wherein W is the velocity of the acoustic wave.

3. An output device for an optical fiber as claimed in claim 1, wherein the acoustic transducer has a curved surface to efficiently concentrate acoustic power onto the optical fiber.

4. An output device for an optical fiber as claimed in claim 1, wherein said sheet is polyethylene.

5. An output device for an optical fiber as claimed in claim 1, wherein the optical fiber is a multi-mode fiber, $\alpha$ is the inclination angle of the acoustic transducer with respect to the axis of the optical fiber, $f$ is the frequency of the acoustic wave generated by the acoustic transducer, $k_1$ is the wave number of a planar light wave in a core of the optical fiber, $W$ is the velocity of the acoustic wave, $\theta$ is the propagation angle of guided modes of light propagating in the optical fiber, and $\theta_m$ is the propagation angle of the highest order guided mode, and wherein $\alpha$ and $f$ are chosen to satisfy the following conditions:

$$\alpha = \theta + \sin^{-1}\frac{\pi f}{k_1 W}, \text{ and}$$

$$f \geq \frac{k_1 W}{\pi} \sin\frac{\theta_m - \theta}{2}.$$

6. An output device for an optical fiber as claimed in claim 5, wherein the position of the optical output system is fixed, $\alpha$ is set at a value satisfying the condition:

$$\alpha \geq \theta_m,$$

$f$ is set at a value satisfying the condition: $f=(k_1 W/\pi)\sin(\alpha-\theta)$, and $\theta$ is varied between 0 and $\theta_m$, whereby all of the guided modes propagating in the fiber are extracted.

7. An output device for an optical fiber as claimed in claim 5, wherein the acoustic frequency $f$ is fixed in a range of $$f \leq (k_1 W/2) \sin \theta_m/2,$$

and the inclination angle $\alpha$ is fixed with respect to said value of $f$ to satisfy the condition:

$$\alpha = \sin^{-1}\frac{\pi f}{k_1 W},$$

whereby by moving the optical output system all of the guided modes propagating in the optical fiber are extracted.

8. An acoustical input device for an optical, light conducting fiber, comprising: a quartz block having a semi-circular groove therein of a radius substantially equal to that of an elongated, circular optical fiber, said block having an inclined upper surface, an acoustic transducer secured to said upper surface, a glass block having a refractive index higher than that of the optical fiber and having a semi-circular groove therein of a radius substantially equal to that of the optical fiber, said glass block having an inclined bottom surface, the quartz block and the glass block being arranged to embrace the optical fiber within their respective grooves where an input is desired, the inclined surfaces of the blocks being opposite each other with the narrower ends thereof together, an optically transparent sheet arranged between the groove of the glass block and the optical fiber, a liquid, such as water, provided between the optical fiber and the quartz block, such liquid having a low absorption loss for an acoustic wave and an acoustic impedance close to that of the quartz block to thereby cause a small reflection loss for an acoustic wave, an optical input system aligned with a beam of input light and being arranged separably from the glass block, the acoustic transducer being arranged to generate an acoustic wave having an inclined wave front with respect to the axis of the optical fiber, such acoustic wave thereby causing a beam of input light to be injected by Bragg's condition into the optical fiber and propagated therein in a guided mode.

9. An input device for an optical fiber as claimed in claim 8, wherein the optical fiber is a single mode fiber, and for obtaining an input mode whose propagation constant is $\beta$, the inclination angle $\alpha$ of the acoustic transducer with respect to the axis of the optical fiber is selected to satisfy the condition:

$$\beta/k_2 \cos\alpha \leq 1,$$

wherein $k_2$ is the wave number of a planar wave in a clad of the optical fiber, and the frequency $f$ of the acoustic transducer is given by:

$$f = \frac{W}{2\pi} \sqrt{\beta^2 + k_2^2 - 2\beta k_2 \cos\{180° - \alpha - \sin^{-1}(\frac{\beta}{k_2}\cos\alpha)\}},$$

wherein $W$ is the velocity of the acoustic wave.

10. An input device for an optical fiber as claimed in claim 8, wherein the acoustic transducer has a curved surface to efficiently concentrate acoustic power onto the optical fiber.

11. An input device for an optical fiber as claimed in claim 8, wherein said sheet is polyethylene.

12. An input device for an optical fiber as claimed in claim 8, wherein the optical fiber is a multi-mode fiber, $\alpha$ is the inclination angle of the acoustic transducer with respect to the axis of the optical fiber, $f$ is the frequency of the acoustic wave generated by the acoustic transducer, $k_1$ is the wave number of a planar light wave in a core of the optical fiber, $W$ is the velocity of the acoustic wave, $\theta$ is the propagation angle of guided modes of light propagating in the optical fiber, and $\theta_m$ is the propagation angle of the highest order guided mode, and wherein $\alpha$ and $f$ are chosen to satisfy the following conditions.

$$\alpha = \theta + \sin^{-1}\frac{\pi f}{k_1 W}, \text{ and}$$

$$f \geq \frac{k_1 W}{\pi} \sin\frac{\theta_m - \theta}{2}.$$

13. An input device for an optical fiber as claimed in claim 12, wherein the position of the optical input system is fixed, $\alpha$ is set at a value satisfying the condition:

$$\alpha \geq \theta_m,$$

$f$ is set at a value satisfying the condition: $f=k_1 W/\pi \sin(\alpha-\theta)$, and $\theta$ is varied between 0 and $\theta_m$, whereby the input light is injected into the optical fiber in all of the guided modes propagating therein.

14. An input device for an optical fiber as claimed in claim 12, wherein the acoustic frequency $f$ is fixed in a range of:

$$f \geq (k_1 W/2) \sin \theta_m/2,$$

and the inclination angle $\alpha$ is fixed with respect to said value of $f$ to satisfy the condition:

$$\alpha = \sin^{-1} \frac{\pi f}{k_1 W},$$

whereby by moving the optical input system the light is the guided modes propagating in the fiber.

* * * * *